Figures 1, 2, 3, 4, 5, 6, 7:
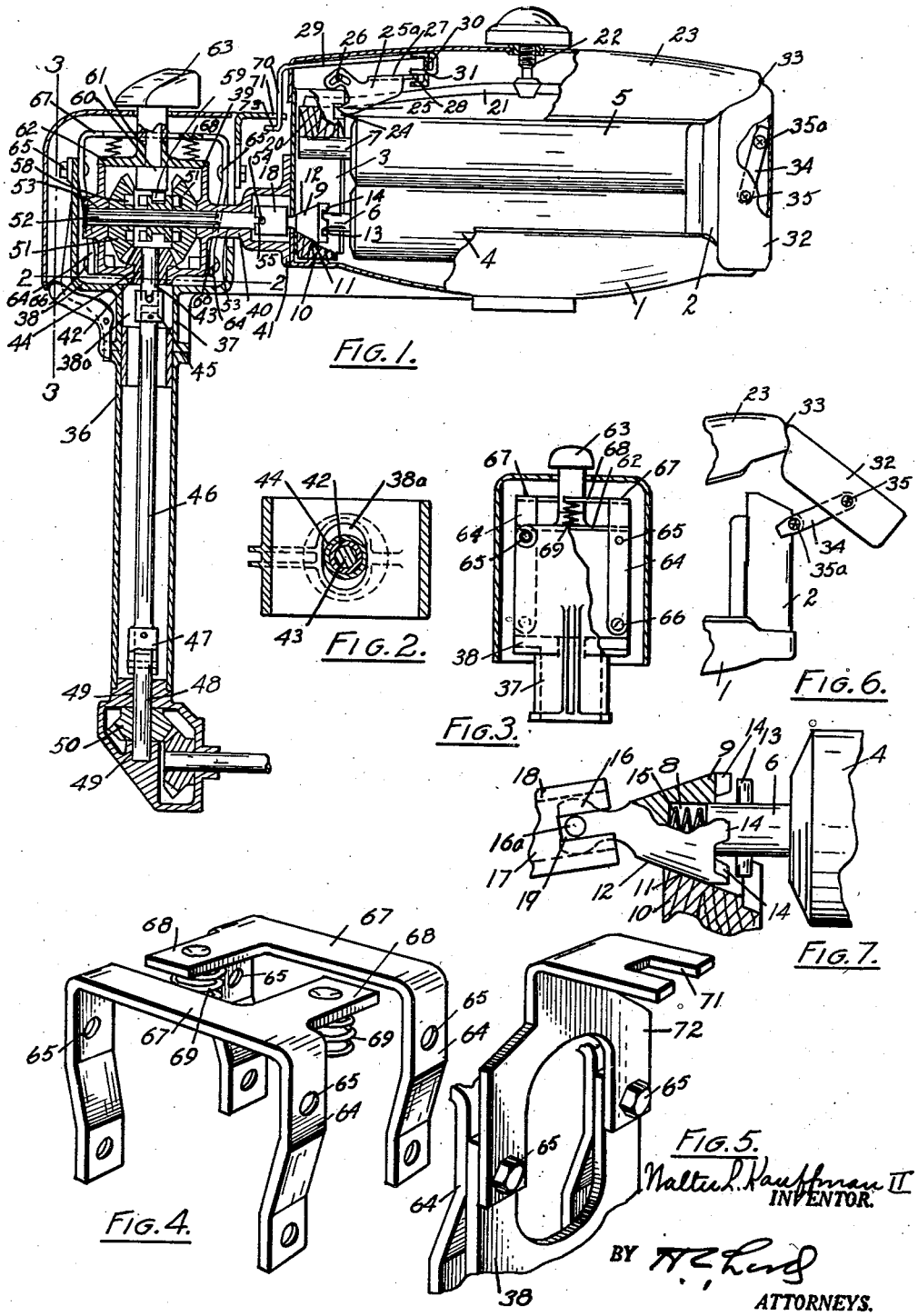

Oct. 1, 1940. W. L. KAUFFMAN, 2D 2,216,399
WRINGER
Filed May 11, 1938

Walter L. Kauffman II
INVENTOR.
BY
ATTORNEYS.

Patented Oct. 1, 1940

2,216,399

UNITED STATES PATENT OFFICE 2,216,399

WRINGER

Walter L. Kauffman, II, Erie, Pa., assignor to Lovell Manufacturing Company, Erie, Pa., a corporation of Pennsylvania Application May 11, 1938, Serial No. 207,334

9 Claims. (Cl. 68—253)

Power wringers are commonly provided with some safety device for relieving an operator should she get caught in the rolls. There are two common methods of accomplishing this, one to relieve the pressure on the rolls, and the other to stop the rolls. The present invention is directed to a safety mechanism which responds to a movement of the wringer as a whole so that the instinctive action of a person caught in the rolls may be utilized to effect a safety action. In the invention as illustrated not only is the pressure released but the driving action of the rolls is stopped.

In carrying out the invention the wringer is preferably hung on parallel links, the links being secured at their tops with horizontal pivots so that the wringer as a whole is moved and maintained in position substantially parallel. This manner of suspending the wringer tends to return the wringer to its central position by reason of the fact that the lowest position of the swinging part of the links is reached at the center. A safety action is accomplished by a movement in either direction from this center. Features and details of the invention will appear from the specification and claims.

A preferred embodiment of the invention is illustrated in the accompanying drawing as follows:

Fig. 1 shows an elevation partly in section of the wringer, its mounting and driving mechanism.

Fig. 2 a section on the line 2—2 in Fig. 1.

Fig. 3 a section on the line 3—3 in Fig. 1.

Fig. 4 a perspective view showing the arrangement of links.

Fig. 5 a perspective view of a trip bracket.

Fig. 6 a side elevation showing a reset device in release position.

Fig. 7 an enlarged sectional view of a roll stop device.

1 marks the base of the wringer frame, 2 the stile remote from the driving mechanism, 3 the stile adjacent to the driving mechanism, 4 the lower roll, 5 the upper roll, 6 the shaft of the lower roll and 7 the shaft of the upper roll. These parts are, or may be of usual construction. The shaft 6 extends into an opening 8 in a clutch element 9. This element is carried by a bearing block 10 having a tapered bearing surface 11. The element 9 has a tapered bearing surface 12 operating in the surface 11. A clutch pin 13 extends through the shaft 6 in position to be engaged by jaws 14 on the element 9. A spring 15 is arranged in the opening 8 and tends to force the element out of engagement with the pin 13. When pressure is placed on the roll this pressure acting through the tapered surfaces cams the element into locking engagement with the pin 13. As pressure is released the spring moves the element of engagement. The element has a ball shaped end 16 which extends into an opening 17 of a flexible coupling 18. A pin 16a extends from the ball end through a slot 19 in a tube 18 and thus locks the element with the tube but permits of its endwise movement for movement into and out of engagement with the pin 13. Sliding bearing blocks 20 form journals for the upper shaft 7. A pressure spring 21 rests on these bearing blocks and is adjusted by screw 22 operating in the top bar 23.

The stile 3 has an opening 24 in its inner face forming a shoulder receiving a hook end 25 of a latch 25a. The latch has a slot through which a pin 26 extends so that the latch has a pivotal movement and a slight endwise movement to permit its return to set position. The latch is preferably U-shaped having two plates at the sides connected by cross plate 27. A finger 28 extends from the cross plate. This latch is similar to a latch shown and described in my former applications #45,282 filed October 16, 1935, and #131,333, filed March 17, 1937.

A trip rod 29 extends through the end of the top bar and through a bearing plate 30 secured in the top bar. The trip rod has a return bend 31 the end of which engages the finger 28 and as the trip rod is rotated the return bend is moved off of the finger thus permitting the latch 25 to disengage itself from the stile.

At the opposite end of the top bar the wringer is provided with a resetting mechanism. This is formed by a lever 32 hinged to the top bar at 33. A link 34 forming a toggle with the lever 32 is pivoted to the lever 32 at 35 and to the stile 2 at 35a. The pivots 33, 35a and 35 are slightly out of line when the lever is in its set position, as shown in Fig. 1, so that it is initially stable. As the top bar is released, however, the pivot 33 is moved sufficiently to change this alignment to an unstable condition so that the resetting mechanism swings to position shown in Fig. 6, allowing the top bar to lift sufficiently to relieve the pressure and permit opening of the rolls.

The wringer is carried by post 36. A mounting head extension 37 is swiveled on this post in the usual manner and the head 38 is arranged on this extension. The head generally has two side posts on which the wringer is hung. A gear frame 39 has an extension 40 which terminates in a plate 41 which plate is secured to the stile 2. The gear frame and wringer therefore are fixed relatively to each other. A driving gear 42 is driven from a shaft 43, the gear being journaled in a bearing 44 in the gear frame. The shaft 43 is connected by detachable coupling 45 with a shaft 46 which shaft 46 is secured by coupling 47 to a shaft 48. The shaft 48 is carried by a bearing 49 ordinarily secured to a washing machine frame and the shaft is driven through a gear 50 from any convenient source of power, ordinarily the motor of a washing machine. The shaft 43 extends through an elongated opening 38a in the head 38 so that it may move forward and back with the wringer, the shaft 46 permitting this movement either through the couplings or the springing of the shaft. Reversing gears 51 are journaled on a shaft 52. The shaft is carried by bearings 53 in the gear frame. The inner end of the shaft 52 has a pin 54 engaging a slot 55 in the tube 18, thus completing through the flexible coupling the connection with the drive element 9 and consequently the drive shaft of the wringer. The clutch block is splined on the shaft 52. The clutch block having the usual jaws and annular groove is splined, the jaws on the block engage similar jaws 58 on the faces of the reversing gears. A crank 59 operates in the block groove and is carried by a pin 60. The pin 60 is journaled in a bearing 61 arranged on a cap 62 on the gear frame. An operating handle 63 is fixed on the upper end of the shaft 60 by means of which the crank may be moved to throw the clutch block and thus reverse the gearing.

Two pairs of links 64 have pivots 65 connecting them with the upper part of the head 38. The lower ends of these links are pivotally connected at 66 with the gear frame. Each pair of links is connected by a bar 67 which extends between the upper ends of the link. With this mechanism the wringer is free to move forward and back and is equally sensitive to pressure throughout the length of the wringer. The arrangement of links gives to the wringer a slightly curved path with the lowest point of the path at the central position. Thus there is the tendency for the wringer to remain in the central position. Fingers or projections 68 rest on springs 69, the springs being mounted on the top plate 62. These springs also tend to center the wringer in that they are equalized at the central position.

The rod 29 has a downward extension 70 which extends through a slot 71 in a trip bracket 72. The trip bracket is secured to the gear frame preferably by the upper pivot pins of the links at the wringer side of the head. When the wringer is moved forward or back the downwardly extended portion 70 is retarded by the trip bracket and thus swings the rod 29 and the return bend 31 so that the return bend releases the latch 25 and thus releases the top bar and the pressure on the rolls. The lower end of the bend 70 has the outward extension 73 which is adapted to engage the trip bracket 72 so as to limit the upward throw of the released end of the wringer if desired.

In the general operation of this structure the wringer is in set or operating position at its central position. The gears are locked through the handle 63 to drive the wringer in the desired direction.

Should the operator get caught an instinctive pull to withdraw the fingers moves the wringer and thus moves the trip rod 29 to release the pressure. Immediately the pressure is released the clutch element 9 moves out of engagement with the pins 13 so as to stop the rolls. In resetting the wringer it is simply necessary to force down the latch end of the top so that it is engaged and then draw down the opposite side of the top through the toggle resetting mechanism.

What I claim as new is:

1. In a wringer having a wringer frame, rolls mounted in the frame, a safety device for the wringer, a gear frame fixed with the wringer frame, and reversing gear mechanism in the gear frame for driving the rolls; the combination with said wringer frame, rolls, safety device, gear frame and reversing gear mechanism of a mounting head on which the gear frame is mounted and movable horizontally forward and back, and a communicating means actuating the safety device in response to relative movement of the wringer frame and head.

2. In a wringer having a wringer frame, rolls mounted in the frame, and a safety device for the wringer; in combination with said wringer frame, rolls and safety device of a supporting means having a movable mounting comprising paralleling swinging links forming a connection between the wringer frame and the support, the pivots of said links having horizontal axes, said connection controlling the movement of the wringer frame through the links from position to position in parallel, and a communicating means actuating the safety device in response to relative movement of the wringer frame and head.

3. In a wringer having a wringer frame, rolls mounted in the frame, and a safety device for the wringer; the combination with the wringer frame, rolls and safety device of a supporting means having a movable mounting for the frame comprising paralleling swinging links hung at the top forming a connection between the frame and the supporting means, the pivots of said links having horizontal axes, said connection controlling the movement of the wringer frame through the links from position to position in parallel and a communicating means actuating the safety device in response to the movement of the frame.

4. In a wringer having a wringer frame, rolls mounted in the frame, and a safety device for the wringer; the combination with the wringer frame, rolls and safety device of a supporting means having a movable mounting for the wringer frame comprising paralleling swinging links hung at the top forming a connection between the wringer frame and the supporting means, the pivots of said links having horizontal axes, said connection controlling the movement of the wringer frame through the links from position to position in parallel, and a communicating means actuating the safety device in response to either forward or rearward movement of the wringer frame.

5. In a wringer having a wringer frame, rolls mounted in the frame, a pressure device for the rolls, a safety device releasing the pressure device; the combination with the wringer frame, rolls, pressure device and safety device of a supporting means having a movable mounting for the wringer frame comprising paralleling swinging links forming a connection between the wringer frame and the supporting means, the pivots of said links having horizontal axes, said connection controlling the movement of the wringer frame through the links from position to position in parallel, and a communicating means actuating the safety device in response to movement of the wringer frame.

6. In a wringer having a wringer frame, rolls mounted in the frame, a driving mechanism for the wringer and a safety device for the wringer comprising mechanism releasing the driving mechanism; the combination with the wringer frame, rolls, driving mechanism and safety device of a supporting means having a movable mounting for the wringer frame comprising paralleling swinging links forming a connection between the frame and the supporting means, the pivots of said links having horizontal axes, said connection controlling the movement of the wringer through the links from position to position in parallel, and a communicating means actuating the safety device in response to the movement of the wringer frame.

7. In a wringer having a wringer frame, rolls mounted in the frame, a driving mechanism for the rolls, a pressure device for the rolls, releasing mechanism releasing the pressure on the rolls and the driving mechanism; the combination with the wringer frame, rolls, driving mechanism, pressure device and safety device of a supporting means having a movable mounting for the wringer frame comprising paralleling swinging links forming a connection between the wringer frame and the supporting means, the pivots of the links having horizontal axes, said connection controlling the movement of the wringer through the links from position to position in parallel, and a communicating means actuating the safety device in response to the movement of the wringer frame.

8. In a wringer having a wringer frame, rolls mounted in the frame, a safety device for the wringer, reversing gears for driving the rolls; the combination with the wringer frame, rolls, safety device, and reversing gears of a mounting head forming a supporting means for the wringer frame, a gear frame mounted on the head through paralleling links, the wringer frame being fixed with the gear frame and the links permitting the movement of the wringer frame from one position to another in parallel, and communicating means actuating the safety device in response to relative movement of the frame and head.

9. In a wringer having a wringer frame, rolls mounted in the frame, reversing gear mechanism for driving the rolls, said gear mechanism comprising opposed reversing gears having axes paralleling the rolls, a driving gear meshing with the reversing gears, and a clutch mechanism locking either reversing gear with the rolls; the combination with the wringer frame, rolls, reversing gear mechanism, driving gear and clutch mechanism of a mounting head forming a support for the wringer frame, a gear frame mounted on the head through paralleling links, the wringer frame being fixed with the gear frame, said links rendering the frame movable from one position to another in parallel, and a communicating means actuating the clutch in response to the movement of the wringer frame.

WALTER L. KAUFFMAN, II.